C. LYNE.
Child's Carriage.
No. 81,387.  Patented Aug. 25, 1868.
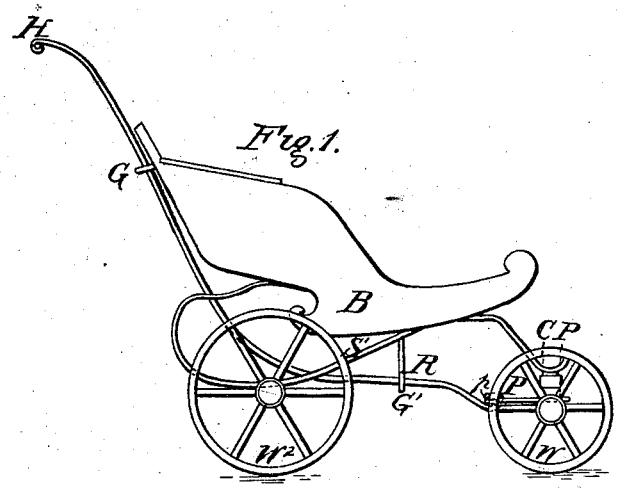
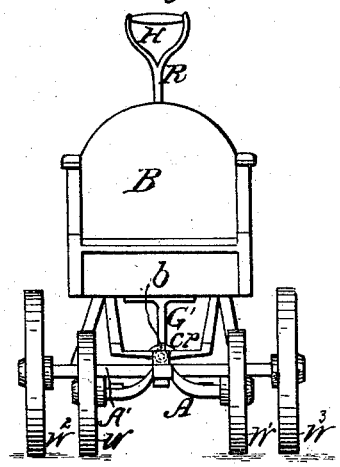
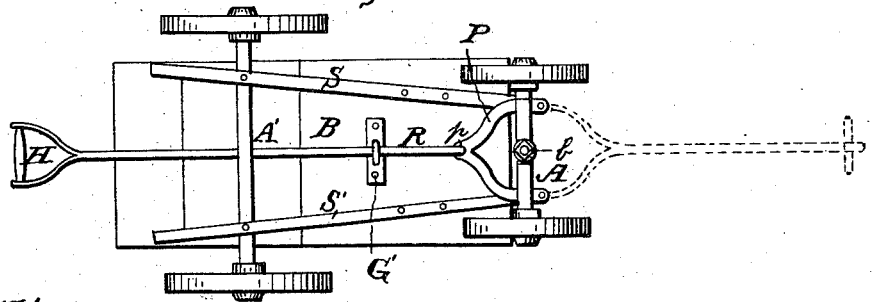
Witnesses:  Inventor:
Charles Lyne

United States Patent Office.

CHARLES LYNE, OF PADSTOW, ENGLAND.

Letters Patent No. 81,387, dated August 25, 1868.

IMPROVEMENT IN PERAMBULATORS.

The Schedule referred to in these Letters Patent and making part of the same.

TO ALL WHOM IT MAY CONCERN:

Be it known that I, CHARLES LYNE, of Padstow, county of Cornwall, England, have invented a new and useful Improvement in Perambulators; and I do hereby declare that the following is a full, clear, and exact description of the construction and operation of the same, reference being had to the accompanying drawings, making a part of this specification, in which—

Figure 1 is a side view of my improvement in perambulators.

Figure 2 is a front view of same.

Figure 3 is a bottom view of same.

The nature of my invention consists in constructing a perambulator so that the party propelling it at the rear can have control of the front wheels, and guide them in any desired direction.

To enable those skilled in the art to make and use my invention, I will now proceed to describe its construction and operation.

The wheels W, W$^1$, W$^2$, and W$^3$, body B, and rear axle A' are of ordinary construction. The front axle, A, is made bow-shaped, and flat at its centre. At this point a cross-piece, C P, is placed, and is held in position by means of a bolt, $b$, which passes through it and through the centre of axle A. On the lower end of the bolt $b$ a nut is placed, to prevent its being drawn out. Bolt $b$ is made to fit sufficiently loose to allow the axle A to turn freely upon it. Secured to the top, and at the outer ends of the cross-piece C P, are two metallic springs, S and S', which extend under and are secured to the bottom of the body B and the back axle A'. On top of the axle A, and on the inside of the wheels W and W$^1$, is fastened a bow-shaped plate, P. The ends of said plate extend over a short distance in front of the axle A, and are provided with circular openings. An opening is also made in the plate at the point $p$, through which the end of the rod R passes, the end of the rod being turned over, in order to hold it in place. The rod R extends under the body B, and curves up in the back to a suitable height, and the end provided with a handle, H. Rod R passes through guides, G and G', placed on the back and under side of the body B, for the purpose of supporting and guiding it.

Operation.

When it is desired to turn the perambulator to the right or left, the person propelling the vehicle gives a slight twist or turn to the handle H, which will, by means of the rod R and plate P, turn the front axle A on the bolt $b$ as far around as desired, the handle H being turned in the contrary direction to the wheels.

If it is desired, the perambulator can be pulled from the front by means of a handle hooked to the front end of the rod or plate P, as shown in red lines, fig. 3.

Having thus described my invention, its construction and operation, what I claim, and desire to secure by Letters Patent, is—

The arrangement of the axle A, cross-piece C P, bolt $b$, plate P, rod R, guides G and G', and springs S and S', in the manner and for the purpose herein set forth and described.

In testimony whereof, I have hereunto signed my name in the presence of two subscribing witnesses.

CHARLES LYNE.

Witnesses:
ISAAC R. OAKFORD,
HENRY ROELLIG.